(12) United States Patent
Shiotsu

(10) Patent No.: US 7,106,382 B2
(45) Date of Patent: Sep. 12, 2006

(54) INFORMATION PROCESSING SYSTEM AND INFORMATION PROCESSING APPARATUS

(75) Inventor: Shinichi Shiotsu, Kobe (JP)

(73) Assignee: Fujitsu Limited, Kawasaki (JP)

( * ) Notice: Subject to any disclaimer, the term of this patent is extended or adjusted under 35 U.S.C. 154(b) by 405 days.

(21) Appl. No.: 10/105,214

(22) Filed: Mar. 26, 2002

(65) Prior Publication Data
US 2003/0038897 A1 Feb. 27, 2003

(30) Foreign Application Priority Data
Aug. 23, 2001 (JP) ............................. 2001-252556

(51) Int. Cl.
*H04N 5/46* (2006.01)
*H04N 3/27* (2006.01)

(52) U.S. Cl. ...................... 348/555; 348/725; 348/729; 348/706; 348/554; 725/59; 455/277.2

(58) Field of Classification Search ................ 348/570, 348/553, 554, 555, 552, 725, 723, 729, 732, 348/731, 706, 705, 180, 181, 193; 455/277.1, 455/277.2, 154.1, 191.3, 197.1, 226.1, 226.2, 455/226.3; 725/38, 51, 68, 59, 70, 110, 81, 725/109, 82, 132, 133, 139, 141, 151, 153
See application file for complete search history.

(56) References Cited

U.S. PATENT DOCUMENTS

| | | | | |
|---|---|---|---|---|
| 4,697,209 A | * | 9/1987 | Kiewit et al. ................. | 725/19 |
| 5,235,425 A | * | 8/1993 | Oh .............................. | 348/731 |
| 5,255,097 A | * | 10/1993 | Spiero et al. ................ | 348/706 |
| 5,313,660 A | * | 5/1994 | Lindenmeier et al. ...... | 455/135 |
| 5,335,010 A | * | 8/1994 | Lindemeier et al. ........ | 348/706 |
| 5,850,265 A | * | 12/1998 | Suh ............................. | 725/110 |
| 5,949,498 A | * | 9/1999 | Rudolph ...................... | 348/725 |
| 5,966,186 A | * | 10/1999 | Shigihara et al. ........... | 348/570 |
| 5,973,750 A | * | 10/1999 | Ogawa et al. .............. | 348/570 |
| 6,097,383 A | * | 8/2000 | Gaughan et al. ............ | 715/717 |
| 6,216,263 B1 | * | 4/2001 | Elam .......................... | 725/28 |
| 6,611,958 B1 | * | 8/2003 | Shintani et al. ............. | 725/58 |

(Continued)

FOREIGN PATENT DOCUMENTS

JP 6-252896 9/1994

(Continued)

OTHER PUBLICATIONS

Notification of Reasons for Refusal dated Apr. 6, 2005 for Application No. 2001-252556.

Primary Examiner—David Ometz
Assistant Examiner—Jean W. Désir
(74) Attorney, Agent, or Firm—Staas & Halsey LLP

(57) ABSTRACT

An information processing system and apparatus receiving a television broadcast includes: a direct receiving unit directly receiving television broadcast waves; an indirect receiving unit indirectly receiving the television broadcast waves; and a switching unit determining whether the television broadcast waves are to be received by the direct receiving unit or the indirect receiving unit by switching between the direct receiving unit and the indirect receiving unit based on their reception conditions. With this configuration, it is possible to obtain television-broadcast video signals from the selected receiving unit. The indirect receiving unit is preferably formed of a communication device provided with a wireless cellular telephone function using a wideband code division multiple access (W-CDMA) system in which signals having a large transmission capacity can be transmitted and received, or a communication device provided with a wireless LAN communication function.

19 Claims, 9 Drawing Sheets

U.S. PATENT DOCUMENTS

| | | | |
|---|---|---|---|
| 6,650,376 B1 * | 11/2003 | Obitsu | 348/730 |
| 6,700,624 B1 * | 3/2004 | Yun | 348/555 |
| 6,731,347 B1 * | 5/2004 | Takano et al. | 348/558 |
| 6,741,293 B1 * | 5/2004 | Obuchi | 348/554 |
| 6,771,318 B1 * | 8/2004 | Ninomiya | 348/570 |
| 2001/0006404 A1 * | 7/2001 | Yun | |

FOREIGN PATENT DOCUMENTS

| | | |
|---|---|---|
| JP | 10-112724 | 4/1998 |
| JP | 11-068686 | 3/1999 |
| JP | 2001-211126 | 8/2001 |
| JP | 2001-217735 | 8/2001 |
| JP | 2001-308747 | 11/2001 |

* cited by examiner

INFORMATION PROCESSING SYSTEM AND INFORMATION PROCESSING APPARATUS

BACKGROUND OF THE INVENTION

1. Field of the Invention

The present invention generally relates to an information processing apparatus having a built-in television-broadcast receiving function for receiving television broadcasts, and more particularly, to an information processing apparatus which allows viewers to watch television broadcasts regardless of the reception condition of the television broadcasts.

2. Description of the Related Art

Personal computers (hereinafter referred to as "PCs") having a television-broadcast receiving function are becoming widespread. At present, desk-top PCs having a television-broadcast receiving function are primarily used. However, when digital terrestrial broadcasts start in Japan in 2003, it will be possible to receive relatively high-quality images while viewers are moving. It is thus expected that a television-broadcast receiving function will be installed in mobile terminal devices, such as notebook PCs.

As discussed above, because of the forthcoming implementation of digital terrestrial broadcasts, it will become possible to easily watch television broadcasts with mobile terminal devices. However, the following problems will be encountered.

When a viewer watches a television broadcast while moving around outdoors, the broadcast wave may be intercepted by, for example, buildings, thus causing the intensity (strength) of the received signal to decrease, thereby interrupting the continuous reception of images.

In order to solve the problem of fading caused by the reception of broadcast waves via a plurality of paths, diversity reception should be performed. This, however, makes it necessary to increase the size of mobile terminal devices due to, for example, the need to provide a plurality of antennas.

Additionally, when a viewer watches a television broadcast with a mobile terminal device indoors, high quality images cannot always be received due to the influence of objects intercepting the signals, such as the walls of buildings. This may be overcome by connecting the mobile terminal device to an antenna cable or by using a wireless local area network (LAN). However, the connection of an antenna cable restricts the viewing location, thus preventing the viewer from moving around indoors, thereby eliminating the advantages of using a mobile terminal device. Unlike the reception of television broadcasts, the use of a wireless LAN requires the transmission of radio waves, which increases the power consumption and also increases the number of bands required to receive high bandwidth data, such as, moving pictures. This results in a decrease in the transmission rate of other wireless LAN devices regardless of the reception condition of a television broadcast by using a mobile terminal device.

Also, when a viewer is away from his/her local area, he/she is unable to watch local broadcasts.

SUMMARY OF THE INVENTION

Accordingly, the present invention has been made in order to solve the above-described problems.

An information processing apparatus for use in an information processing system includes: direct receiving means for directly receiving television broadcast waves; indirect receiving means for indirectly receiving the television broadcast waves; and switching means for determining whether the television broadcast waves are to be received by the direct receiving means or the indirect receiving means by switching between the direct receiving means and the indirect receiving means based on their reception conditions. With this configuration, it is possible to obtain television-broadcast video signals from the selected receiving means.

The direct receiving means is formed of a television-broadcast receiver for directly receiving the television broadcast waves. The indirect receiving means is preferably formed of a communication device provided with a wireless cellular telephone function using a wideband code division multiple access (W-CDMA) system in which signals having a large transmission capacity can be transmitted and received, or a communication device provided with a wireless LAN communication function. The indirect receiving means accesses a remote terminal device at a predetermined access point via a public circuit network or a private network so as to receive a television broadcast received by the remote terminal device.

If the reception condition of the television broadcast received by the television-broadcast receiver is sufficient for watching the broadcast, the television broadcast signal received by the television-broadcast receiver is used. If the reception condition is not sufficient, the television broadcast signal received by the indirect receiving means is used. Thus, the above-described problems can be solved.

More specifically, according to one aspect of the present invention, there is provided an information processing system including a remote terminal device for transmitting a television broadcast via a communication network and an information processing apparatus. The information processing apparatus includes: a communication device for receiving the television broadcast from the remote terminal device; a television-broadcast receiver for receiving television broadcast waves; and a reception monitor for generating a selection signal for determining whether the television broadcast is to be received by the television-broadcast receiver or by the communication device based on the reception condition of the television broadcast received by the television-broadcast receiver.

With this configuration, a television broadcast can be received by either the television-broadcast receiver or the communication device based on the reception condition of the television-broadcast receiver. If the reception condition of the television-broadcast receiver is not sufficient, the television broadcast can be received from the remote terminal device via the communication device.

According to another aspect of the present invention, there is provided an information processing apparatus including: a television-broadcast receiver; a communication device for receiving a television broadcast via a communication network; and a reception monitor for generating a selection signal for determining whether the television broadcast is to be received by the television-broadcast receiver or by the communication device based on the reception condition of the television broadcast received by the television-broadcast receiver.

With this configuration, a television broadcast can be received by either the television-broadcast receiver or the communication device based on the reception condition of the television-broadcast receiver. If the reception condition of the television-broadcast receiver is not sufficient, the television broadcast can be received from the remote terminal device via the communication device.

DESCRIPTION OF THE PREFERRED EMBODIMENT

Figure 1:
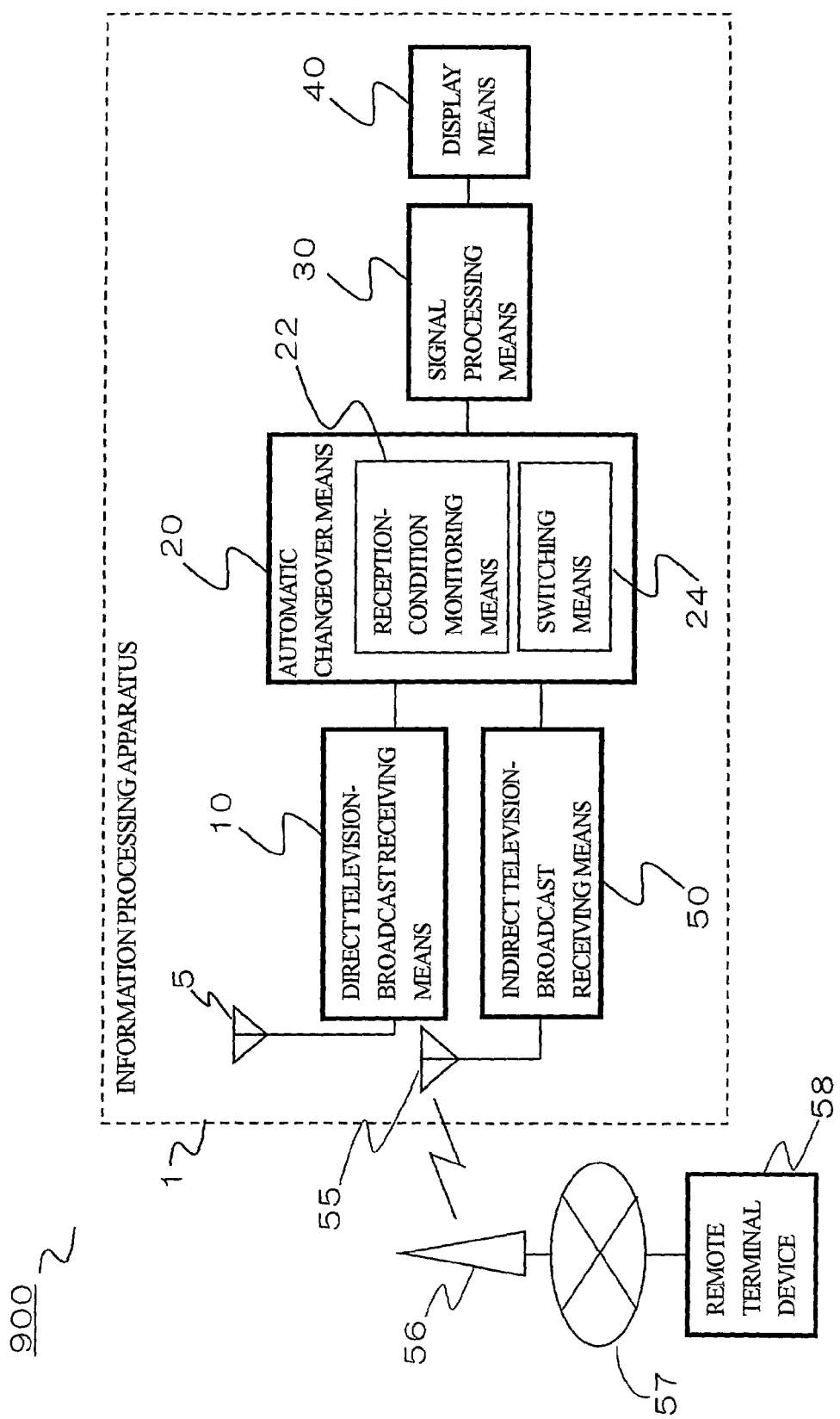
FIG. 1 is a block diagram illustrating the principle of the present invention.

The principle of the present invention is explained below with reference to FIG. 1 which schematically illustrates an information processing system 900. In an information processing apparatus 1 indicated by a region surrounding by the broken line, direct television-broadcast receiving means 10 directly receives television broadcast waves from broadcast stations via an antenna 5, and supplies a corresponding received signal to automatic changeover means 20. In the automatic changeover means 20, reception-condition monitoring means 22 compares the signal-to-noise (S/N) ratio indicating the reception condition of the received signal with a predetermined S/N ratio required for displaying sufficient quality images using the level of the broadcast signal received by the direct television-broadcast receiving means 10.

Meanwhile, indirect television-broadcast receiving means 50 receives a television broadcast signal which is originally transmitted from a remote terminal device 58 having a function for transmitting television broadcasts received at home and which is then wirelessly transmitted from a base station 56 via a public circuit network 57. The reception-condition monitoring means 22 then compares a signal indicating the reception condition, for example, the reception strength, of the television broadcast signal received by the indirect television-broadcast receiving means 50 with a predetermined level of strength required for displaying sufficient quality images using the level of the broadcast signal received by the indirect television-broadcast receiving means 50.

If the signal received by the direct television-broadcast receiving means 10 has a sufficient S/N ratio, switching means 24 is changed to supply the television broadcast signal to signal processing means 30, and a corresponding image is displayed on display means 40 based on the television broadcast signal.

On the other hand, if the signal received by the direct television-broadcast receiving means 10 does not have a sufficient S/N ratio, and if the television broadcast signal received by the indirect television-broadcast receiving means 50 has a sufficient level of reception strength, the switching means 24 is changed to supply the television broadcast signal received by the indirect television-broadcast receiving means 50 to the signal processing means 30. A corresponding image is then displayed on the display means 40 based on the television broadcast signal.

A first embodiment of the present invention is described below in detail with reference to FIGS. 2 through 4.

Figure 2:
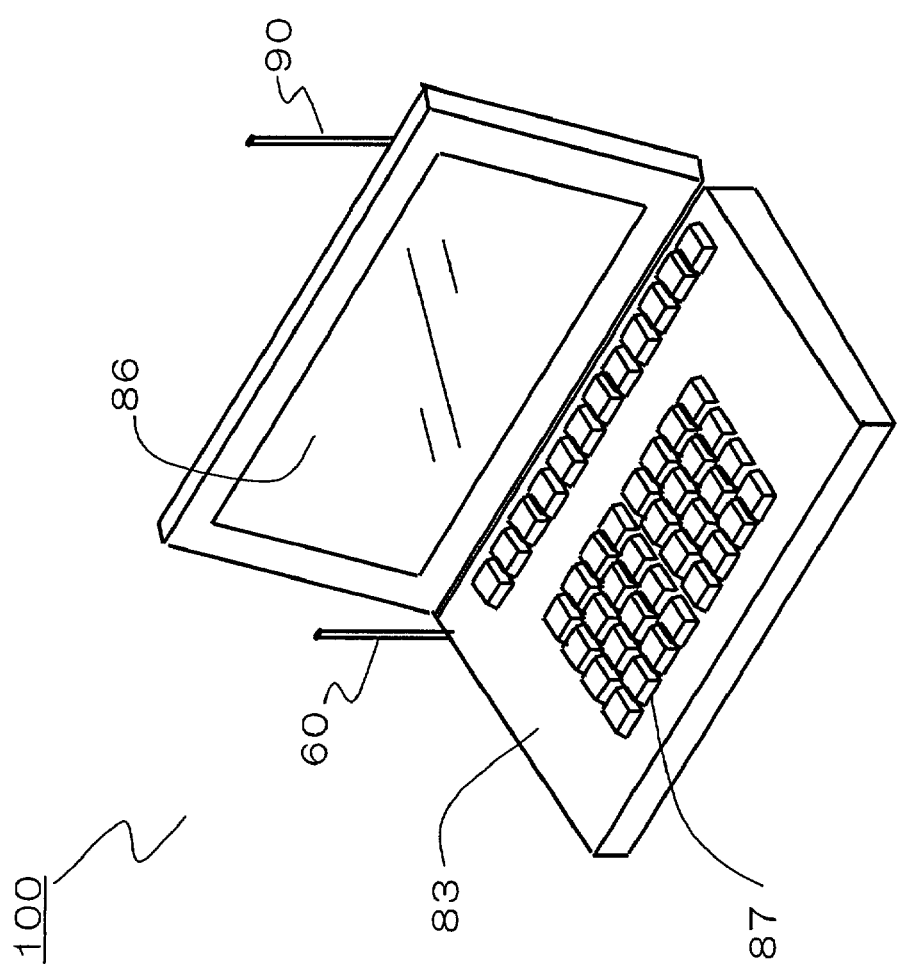
FIG. 2 is a perspective view schematically illustrating an information processing apparatus.

FIG. 2 is a perspective view schematically illustrating an information processing apparatus 100 used in the first embodiment of the present invention. A notebook PC is provided with an antenna 60 connected to a television-broadcast receiver 70, which is included in the notebook PC and serves as the direct television-broadcast receiving means (discussed below), and an antenna 90 connected to the indirect television-broadcast receiving means (discussed below). The notebook PC is also provided with a PC function unit 83 including, for example, an input device 87 and a display device 86.

Figure 3:
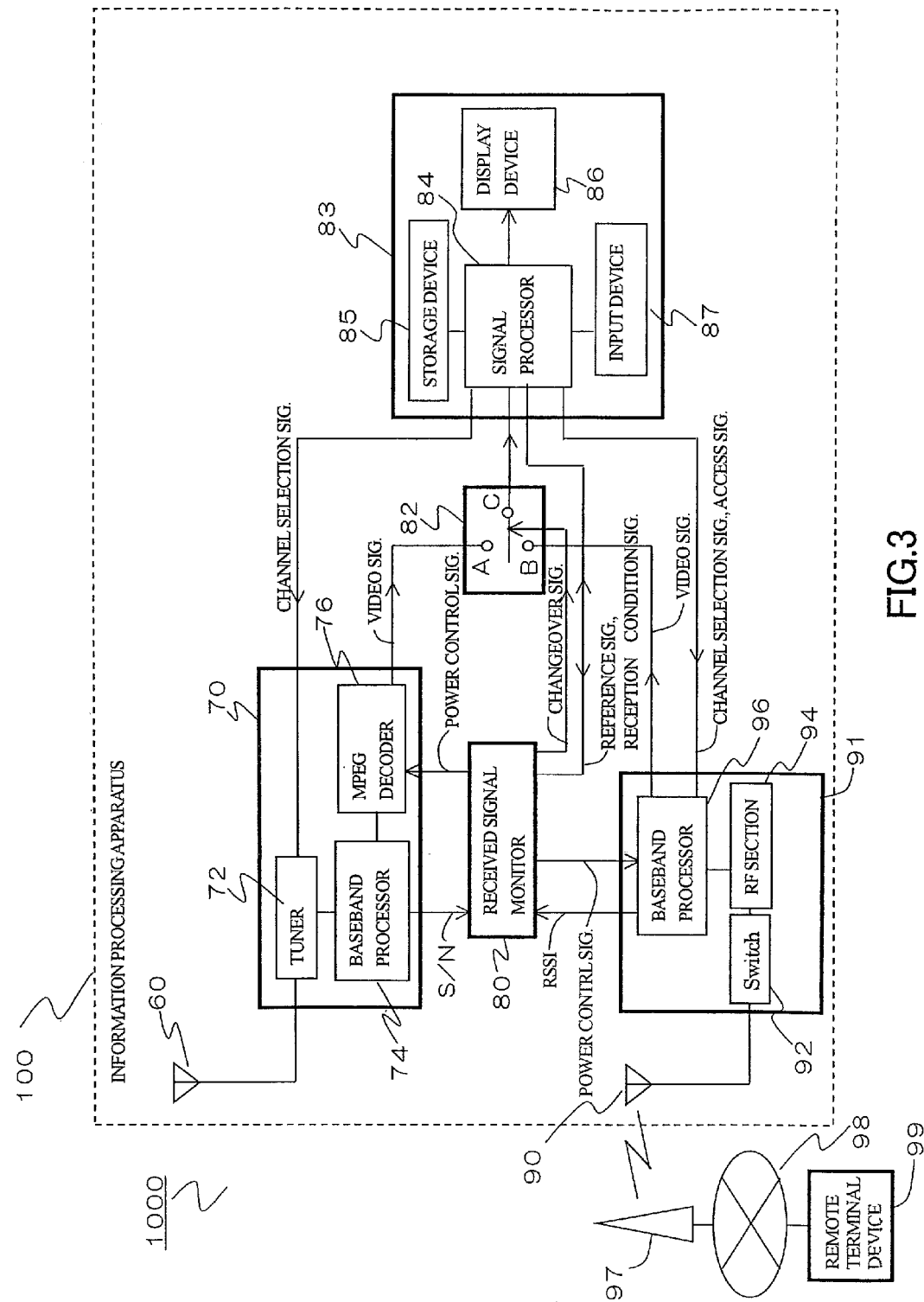
FIG. 3 is a block diagram illustrating a portion of a first embodiment of the present invention.

FIG. 3 is a block diagram illustrating the essential portion of an information processing system 1000 of the first embodiment. FIG. 4 is a flowchart illustrating the processing performed by the first embodiment. The first embodiment is described in detail below with reference to FIGS. 3 and 4.

The information processing apparatus 100 is indicated by a region surrounded by the broken lines in FIG. 3. In this information processing apparatus 100, the direct television-broadcast receiving means is implemented by using the television-broadcast receiver 70. The indirect television-broadcast receiving means is implemented by using a wide-band code division multiple access (W-CDMA) transceiver 91 having a W-CDMA function, which can be connected to a communication line, such as a public circuit network.

Figure 4:
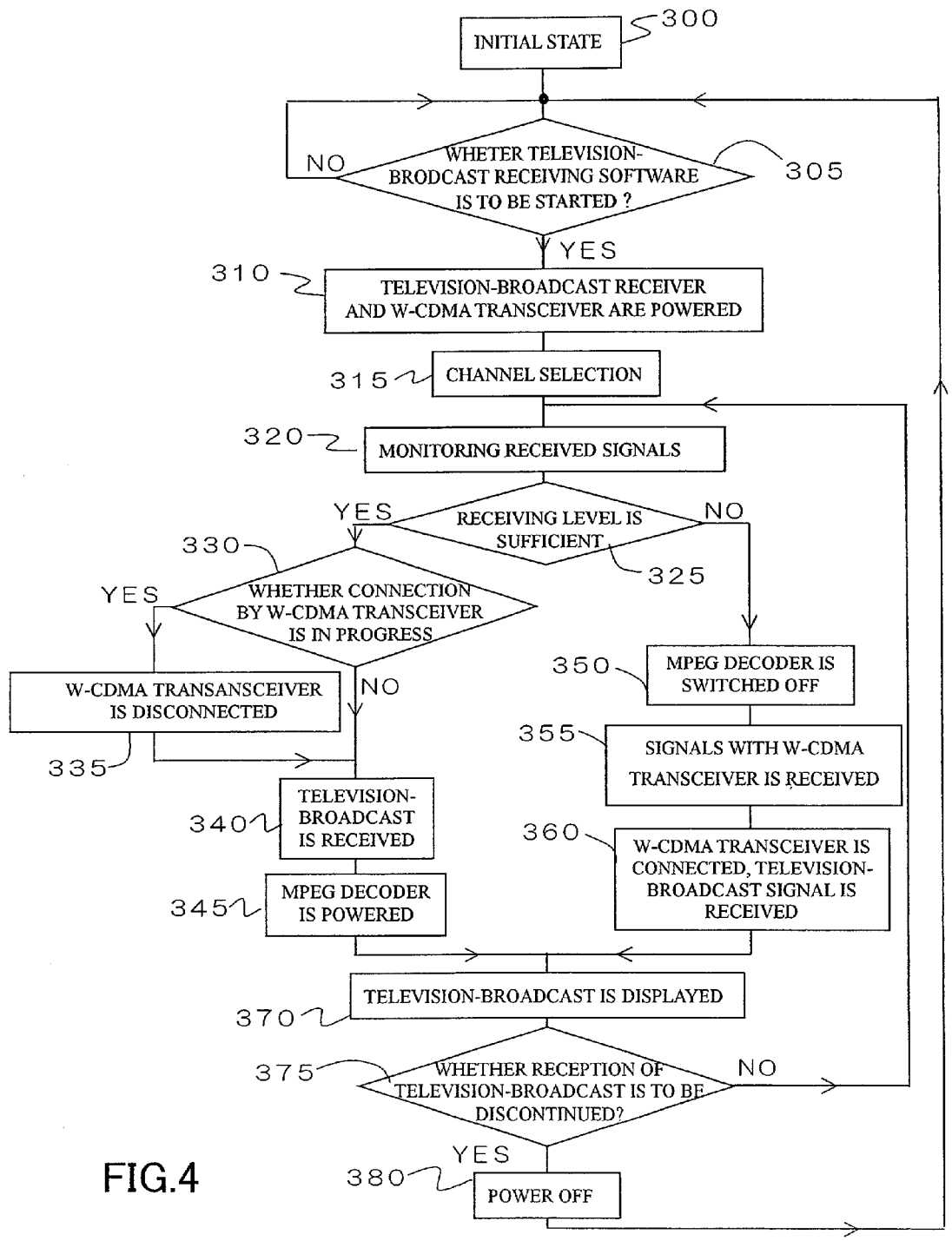
FIG. 4 is a flowchart illustrating the processing performed by the first embodiment.

In the initial state (step 300) of the information processing apparatus 100 in FIG. 4, the PC function unit 83 is powered on, while the television-broadcast receiver 70 and the W-CDMA transceiver 91 is powered off. It is then determined in step 305 whether television-broadcast receiving software is to be started by using the input device 87 of the PC function unit 83. If the outcome of step 305 is yes, the process proceeds to step 310 in which an input screen showing, for example, the channel of a television broadcast to be viewed, is displayed on the display device 86. In response to the television-broadcast receiving software starting, the television-broadcast receiver 70 and the W-CDMA transceiver 91 are powered on.

Then, in step 315, channel information concerning the broadcast channel, and access information concerning the terminal to be accessed via the W-CDMA transceiver 91, for example, a home telephone number, are input from the input device 87, and a corresponding channel selection signal and a corresponding access signal are output from the PC function unit 83.

Furthermore, in step 315, based on the channel selection signal corresponding to the channel information input via the input device 87, a desired channel is selected in a tuner 72 from the television broadcast signal received by the antenna 60. Then, a received signal is input into a baseband processor 74 and undergoes baseband processing. The baseband-processed received signal is supplied to an MPEG decoder 76, and a corresponding video signal is output from the MPEG decoder 76.

The S/N ratio of the received signal is output to a received-signal monitor 80 from the baseband processor 74. In step 320, the received-signal monitor 80 then compares this S/N ratio with a predetermined S/N ratio which is stored in the received-signal monitor 80 or storage means, such as a storage device 85 of the PC function unit 83, and which is required for displaying sufficient quality images using the signal received by the television-broadcast receiver 70.

Meanwhile, the channel selection signal corresponding to the channel information input via the input device 87 and the telephone number are input into the W-CDMA transceiver 91, and are then transmitted from the antenna 90 via a baseband processor 96, a radio frequency (RF) section 94, and a switch 92, which is changed to the transmitting side. A transmission signal including the channel selection signal and the telephone number is received by a base station 97 and is then received at the predetermined telephone number via a public circuit network 98, which may include a wireless network. Then, the desired television broadcast signal is transmitted to the W-CDMA transceiver 91 from a remote terminal device 99 having a television broadcast receiving function and an information transmitting/receiving function.

The transmitted television broadcast signal is received again by the antenna 90 via the public circuit network 98 and the base station 97, and is input into the RF section 94 via the switch 92, which is changed to the receiving side. In the RF section 94, the television broadcast signal is converted into an intermediate frequency signal, which is then supplied to the baseband processor 96 and undergoes baseband processing.

In this embodiment, a signal corresponding to the reception strength of the received signal (received signal strength indicator: RSSI) is output to the received-signal monitor 80 from the baseband processor 96. In step 320, the received-signal monitor 80 compares the RSSI signal with the predetermined level of reception strength which is stored in the received-signal monitor 80 or in the storage device 85 of the PC function unit 83 and which is required for displaying the sufficient quality images.

It is then determined in step 325 based on the comparison results of the S/N ratio and the reception strength by the received-signal monitor 80 whether the reception condition of each of the television-broadcast receiver 70 and the W-CDMA transceiver 91 is sufficient for displaying the images.

If the S/N ratio of the television-broadcast receiver 70 is greater than the predetermined S/N ratio, it means that the outcome of step 325 is yes. Then, a determination is further made in step 330 as to whether connection by the W-CDMA transceiver 91 is in progress. If the result of step 330 is yes, the process proceeds to step 335 in which the communication by the W-CDMA transceiver 91 is disconnected. If it is found in step 330 that connection by the W-CDMA transceiver 91 is not in progress, or after the W-CDMA transceiver 91 is disconnected in step 335, the process proceeds to step 340. In step 340, a changeover signal is transmitted to a changeover circuit 82 from the received-signal monitor 80 so as to connect contact C with contact A. Then, in step 345, a power control signal is transmitted to the MPEG decoder 76 of the television-broadcast receiver 70 from the received-signal monitor 80 so as to switch on the MPEG decoder 76, and also, a power control signal is transmitted to the baseband processor 96 so as to switch off the baseband processor 96.

Subsequently, in step 370, the video signal is output to the PC function unit 83 from the MPEG decoder 76 via the contacts A and C of the changeover circuit 82, and is displayed on the display device 86 via a signal processor 84.

The signal processor 84 may perform various types of signal processing on the video signal. For example, the signal processor 84 may process the video signal so that the size of the image matches the size of the display device 86 or certain frames of the image are stored.

In contrast, if it is found in step 325 that the S/N ratio of the television-broadcast receiver 70 is smaller than or equal to the predetermined S/N ratio, the process proceeds to step 350 in which the MPEG decoder 76 of the television-broadcast receiver 70 is switched off based on the power control signal in order to reduce the power consumption. Then, in step 355, the changeover switch 82 is controlled to connect contact C with contact B based on the reception-condition signal so as to switch on the W-CDMA transceiver 91.

Thereafter, in step 360, the W-CDMA transceiver 91 is connected to the predetermined telephone number, and the television broadcast signal is received from the predetermined telephone number via the communication network. In step 370, the television broadcast image of the desired channel is received from the baseband processor 96 via the changeover switch 82 and the signal processor 84 and is displayed on the display device 86.

It is then determined in step 375 whether the reception of the television broadcast is to be discontinued on occasions, for example, while the television broadcast is being displayed or when the desired program has finished. If the result of step 375 is yes, the process proceeds to step 380 in which the television-broadcast receiver 70 and the W-CDMA transceiver 91 are powered off. Then, the process returns to step 305 in which it is determined whether the television broadcast receiving software is to be started. If the outcome of step 375 is no, the process returns to step 320.

As described above, according to the first embodiment, when the reception level in the television-broadcast receiver 70 becomes lower than a predetermined level, the reception of a television broadcast is automatically changed to the W-CDMA transceiver 91, which serves as the indirect television-broadcast receiving means, thereby maintaining the continuous reception of a television broadcast. Additionally, in the first embodiment, since the television broadcast receiving function is installed in a notebook PC, viewers are able to watch television broadcasts even outdoors. It is possible to select one of the two reception modes, i.e., the direct reception of a television broadcast by the television-broadcast receiver 70 and the indirect reception of a television broadcast by the W-CDMA transceiver 91 via the public circuit network 98 according to the reception condition. The selected reception mode is displayed on the display device 86, such as a monitor. Accordingly, the viewer is able to watch the television broadcast by using the information processing apparatus 100 even while the viewer is moving. The images may be transferred from the remote terminal device 99 according to a videophone system or the Internet.

In this embodiment, the W-CDMA transceiver 91 is powered off in step 335. However, power may be supplied to the W-CDMA transceiver 91 even while a television broadcast is being received by the television-broadcast receiver 70, in which case, the received-signal monitor 80 receives signals from the television-broadcast receiver 70 and the W-CDMA transceiver 91 so as to continue monitoring their reception conditions.

According to the first embodiment configured as described above, even when the reception condition in the television-broadcast receiver 70 becomes poor due to interference by, for example, a building, on occasions, for example, when the viewer is receiving a television broadcast in an automobile, the received-signal monitor 80 is able to determine that the level of the received signal has become lower than a predetermined level. In this case, the power supply to the MPEG decoder 76 is discontinued, and a changeover signal is transmitted to the changeover circuit 82 so as to connect contact C with contact B. Then, a desired television broadcast signal received by the W-CDMA transceiver 91 can be speedily processed in the baseband processor 96, and the processed video signal is then output to the signal processor 84 via the changeover switch 82, and is displayed on the display device 86.

Figure 5:
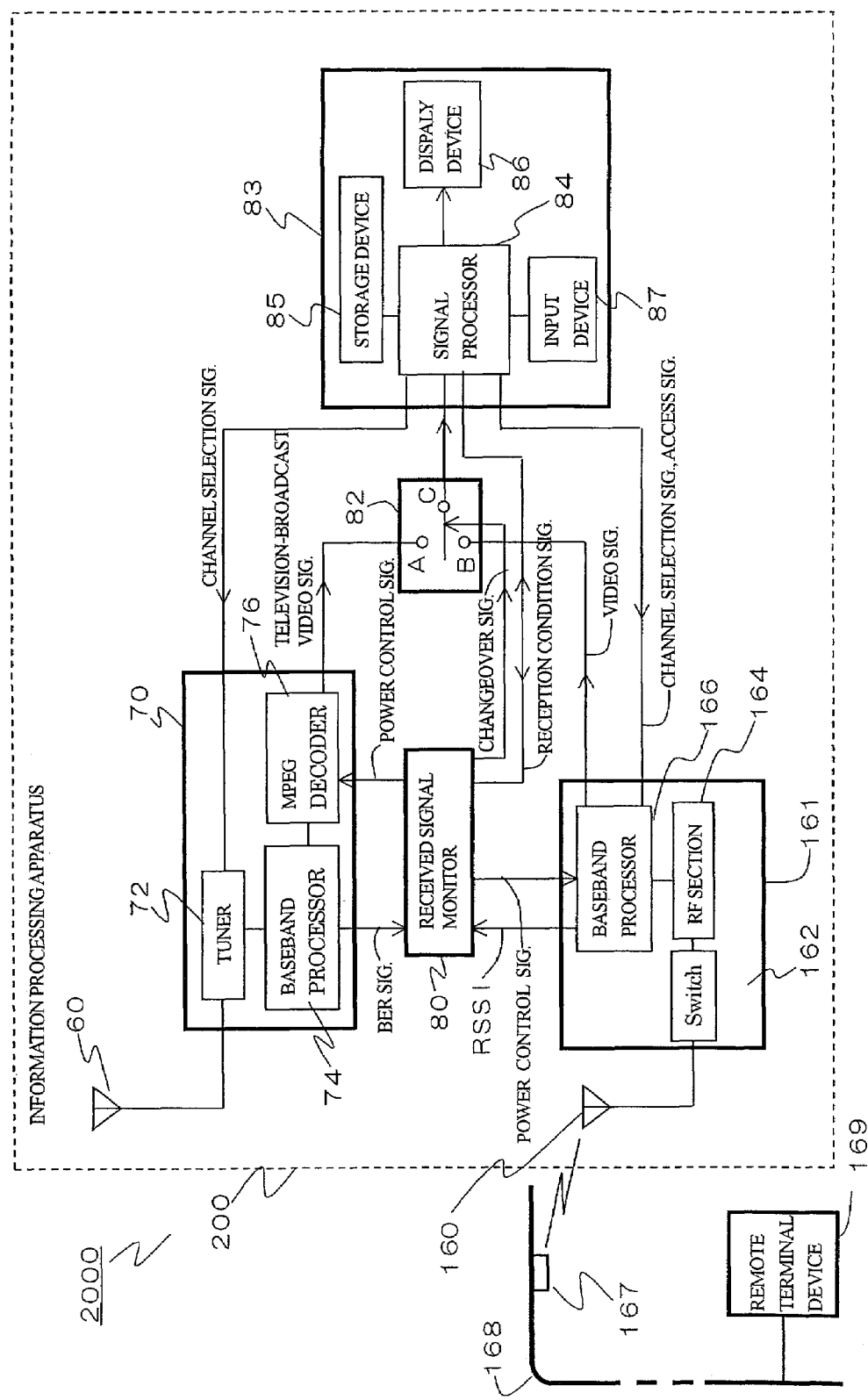
FIG. 5 is a block diagram illustrating a second embodiment of the present invention.
Figure 6:
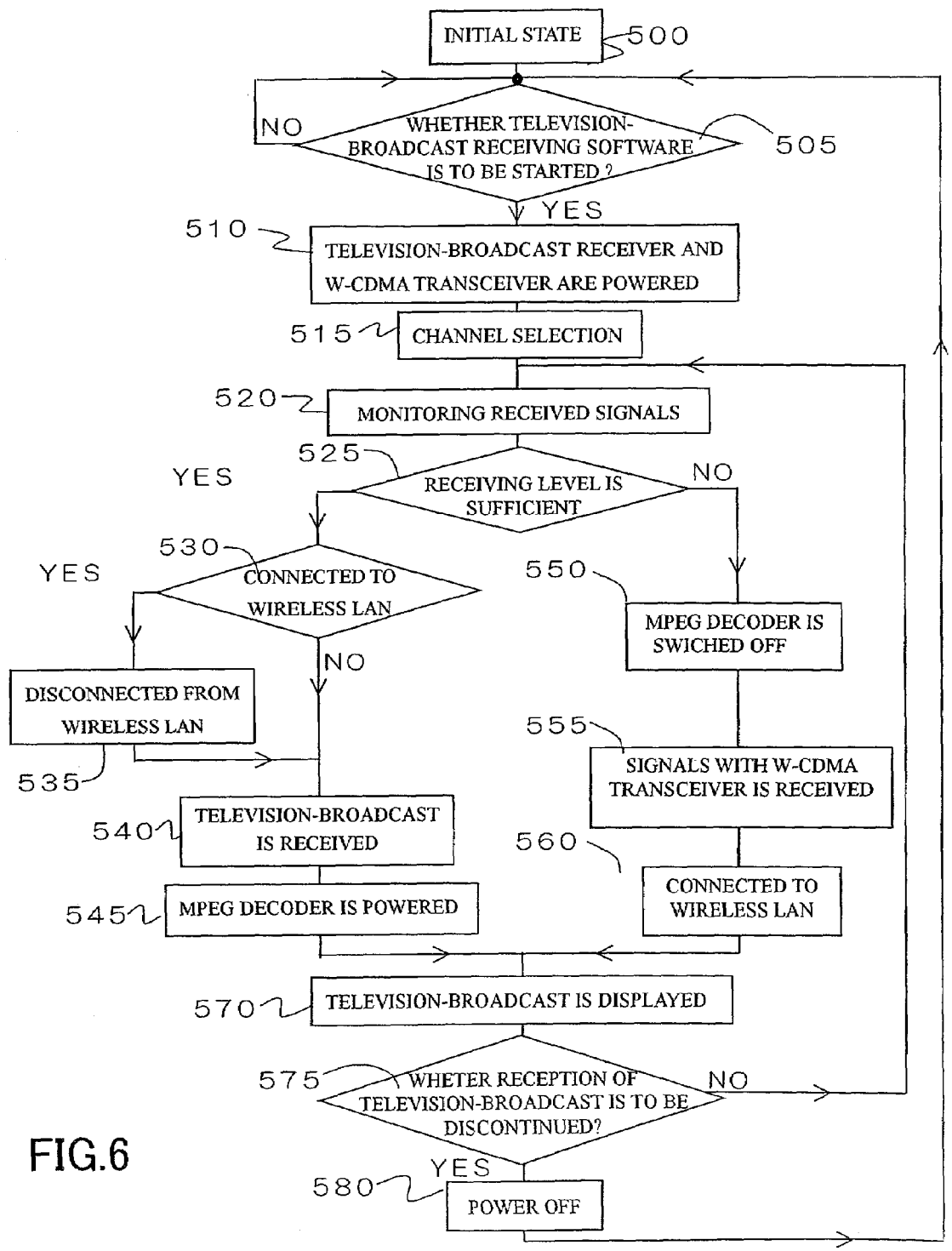
FIG. 6 is a flowchart illustrating the processing performed by the second embodiment.

A second embodiment is described in detail below with reference to FIGS. 5 and 6. FIG. 5 is a block diagram schematically illustrating the configuration of an information processing system 2000 of the second embodiment and an information processing apparatus 200 is indicated by a region surrounded by the broken lines. FIG. 6 is a flowchart illustrating the essential portion of the television-broadcast receiving processing performed by the second embodiment. In the second embodiment, the same or similar functions as or to the first embodiment are designated with like reference numerals.

In the second embodiment, the television-broadcast receiver 70, which serves as a television-broadcast receiving module, and a wireless LAN module 161, which serves as the indirect television-broadcast receiving means, are preferably installed in a portable information processing apparatus 200, such as a notebook PC. Unlike the first embodiment, the wireless LAN module 161, which is accessible to a private line, is installed as the indirect television-broadcast receiving means.

As in step 300 of FIG. 4, in the initial state of the information processing apparatus 200 in step 500 of FIG. 6, the information processing apparatus 200 is powered on, and the television-broadcast receiver 70 and the wireless LAN module 161 are powered off. It is then determined in step 505 whether the television receiving software stored in the storage device 85 of the PC function unit 83 is to be started. If the outcome of step 505 is yes, the process proceeds to step 510. In step 510, the signal processor 84 starts supplying power to the television-broadcast receiver 70 and the wireless LAN module 161. Then, in step 515, channel information concerning the channel of a desired television broadcast and the address of the transmitting side with which the wireless LAN module 161 is to communicate are input via the input device 87.

In step 520, a channel selection signal indicating the channel information is sent to the tuner 72 of the television-broadcast receiver 70, and the television broadcast signal of the selected channel is then output to the baseband processor 74. A bit error rate (BER) signal indicating the reception condition of the received broadcast signal is output to the received-signal monitor 80 from the baseband processor 74. As in the first embodiment, the received-signal monitor 80 compares the BER signal with a predetermined reception level stored in the storage device 85 of the PC function unit 83. It is then determined in step 525 whether the television broadcast signal received by the television-broadcast receiver 70 has a sufficient level for displaying high quality images.

If the outcome of step S525 is yes, the process proceeds to step 530 in which a determination is further made as to whether connection by the wireless LAN module 161 is in progress. If the result of step 530 is yes, the process proceeds to step 535 in which the communication by the wireless LAN module 161 is disconnected. If connection by the wireless LAN module 161 is not in progress, it means that the television broadcast signal is not received by the wireless LAN module 161, and the process proceeds to step 540. In step 540, the power supply to a baseband processor 166 of the wireless LAN module 161 is discontinued, and also, the connection of the changeover circuit 82 is changed to connect contact C with contact A. In step 545, the power supply to the MPEG decoder 76 is started. Then, in step 570, a television-broadcast video signal of the desired channel is output from the MPEG decoder 76, and is displayed on the display device 86 via the changeover switch 82 and the signal processor 84.

On the other hand, if it is found in step 525 by the received-signal monitor 80 that the reception level received by the television-broadcast receiver 70 is lower than the predetermined level, the process proceeds to step 550. In step 550, a power control signal is supplied to the television-broadcast receiver 70 from the received-signal monitor 80 so that the power supply to the MPEG decoder 76 is discontinued.

Then, in step 555, the connection of the changeover switch 82 is changed to connect contact C with contact B. In step 560, the signal processor 84 is connected to the wireless LAN module 161, and the address information of the information processing apparatus 200 is added to the desired channel information and the address information of the transmitting side, both items of information being input via the input device 87 or stored in the storage device 85 in advance. Then, the transmission information including the above-described items of information is transmitted to the baseband processor 166 of the wireless LAN module 161. An RF section 164 converts the transmission information into transmission waves, which are then transmitted from an antenna 160 via a switch 162 which is changed to the transmitting side. The transmission signal is received by a transceiver 167 installed on, for example, a ceiling in a building, and is further received by a remote terminal device 169 identified by the transmitting address via a cable 168, which is a LAN cable. Subsequently, the television broadcast of the desired channel is received by a television-broadcast receiving function provided for the remote terminal device 169, and is transmitted to the information processing apparatus 200 which is indicated in the received transmission information.

In step 570, the received television broadcast signal is input into the baseband processor 166 via the switch 162 and the RF section 164, and undergoes baseband processing. A resulting video signal is then displayed on the display device 86 via the changeover circuit 82 and the signal processor 84.

The above-described LAN cable 168 may include a wireless network. The PC function unit 83 may perform certain processing so that the size of the image matches the size of the display device 86 or the video signal may be stored.

Meanwhile, the baseband processor 166 processes the received signal and outputs the information indicating the RSSI level to the received-signal monitor 80. Then, the received-signal monitor 80 compares the RSSI level with the predetermined RSSI level which is stored in the storage device 85 of the PC function unit 83 and which is required for displaying sufficient quality images using the television broadcast signal received via the wireless LAN module 161.

It is then determined in step 575 whether the reception of the television broadcast is to be discontinued on occasions, for example, while the television broadcast is being displayed or when it is finished. If the outcome of step 575 is yes, the process proceeds to step 580 in which the power supply to the television-broadcast receiver 70 or the wireless LAN module 161 is discontinued. Then, the process returns to step 505 in which a determination is made as to whether a television broadcast is to be viewed. If not, step 505 is repeated.

Even while the television broadcast signal is being received by the television-broadcast receiver 70, the received-signal monitor 80 continues to receive the BER signal from the baseband processor 74 so that it can monitor the reception condition of the television-broadcast receiver 70. For example, when the reception condition of the television-broadcast receiver 70 becomes poor and the BER signal is lowered to a level which is not sufficient for displaying high quality images while the information processing apparatus 200 is being used outdoors, the reception condition is informed to the PC function unit 83 from the received-signal monitor 80. Then, according to the reception condition signal, the PC function unit 83 discontinues the power supply to the MPEG decoder 76 of the television-broadcast receiver 70 and also changes the changeover circuit 82 to connect contact C with contact B. Simultaneously, the PC function unit 83 sends a power control signal to the wireless LAN module 161, and also sends the access signal indicating the indoor access point and the channel selection signal to the baseband processor 166 of the wireless LAN module 161. The wireless LAN module 161 changes the switch 162 to the transmitting side, and transmits the access signal and the channel selection signal via the antenna 160. Thereafter, the switch 162 is changed to the receiving side, and the wireless LAN module 161 enters the reception standby mode.

Even while the television broadcast is being received and displayed via the wireless LAN module 161, the BER signal continues to be sent to the received-signal monitor 80 from the baseband processor 74 of the television-broadcast receiver 70. When the BER signal again reaches the level required for displaying sufficiently high quality images, the reception of the television broadcast by the wireless LAN module 161 is discontinued, and the reception of the television-broadcast receiver 70 is restarted.

As described above, two reception modes are provided for the information processing apparatus 200: the direct reception for receiving a television broadcast by the television-broadcast receiver 70 and the indirect reception for receiving a television broadcast via the wireless LAN module 161. These two modes can be switched according to the reception condition, thereby enabling the viewers to watch television broadcasts either outdoors or indoors.

Although in the second embodiment the wireless LAN module 161 is used as the indirect television-broadcast receiving means, another wireless communication method, such as Bluetooth, may be employed.

A third embodiment is described below with reference to FIGS. 7A and 7B. Only the essential portion of the third embodiment which is applied to the first or second embodiment, i.e., the changeover circuit 82 and the related elements, are shown in FIGS. 7A and 7B.

Figure 7:
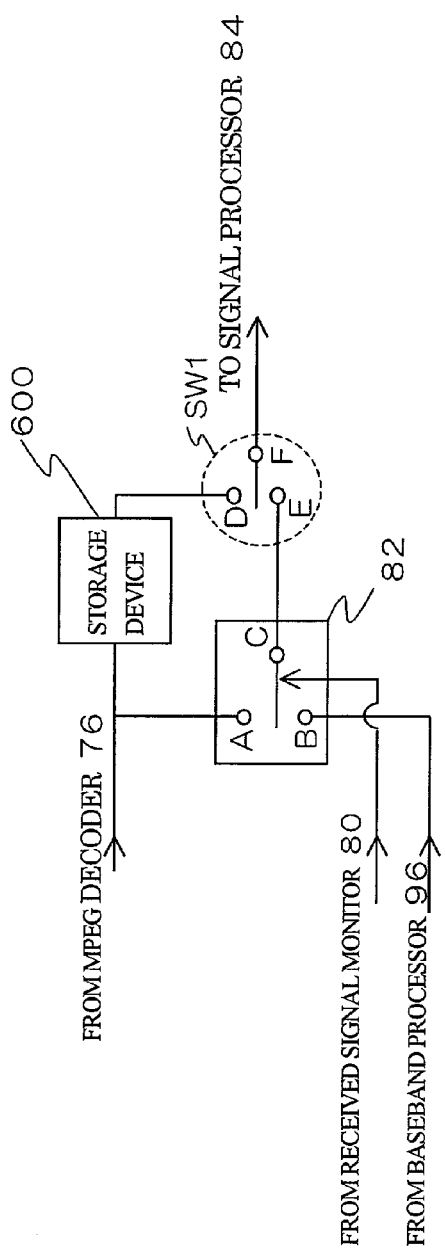
FIGS. 7A and 7B are block diagrams partially illustrating a third embodiment of the present invention.
Figure 7:
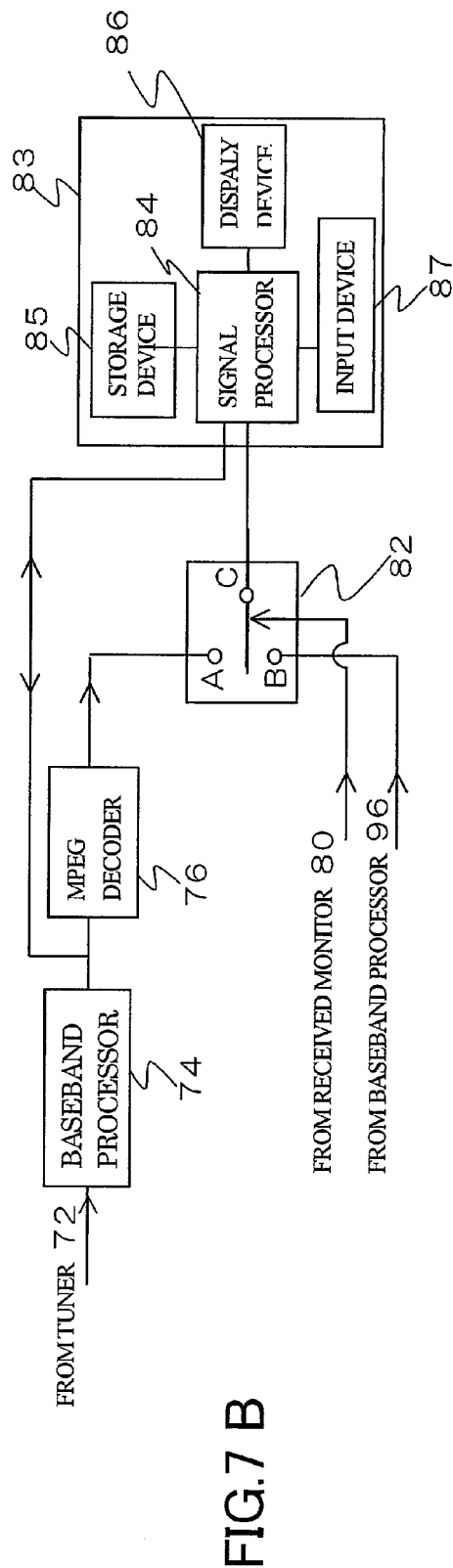

In FIG. 7A, an output from the MPEG decoder 76 is stored in a storage device 600, thereby making it possible to record images from the television-broadcast receiver 70. While the reception mode is being switched to the indirect television-broadcast reception mode by using the W-CDMA transceiver 91 of the first embodiment or the wireless LAN module 161 of the second embodiment due to a poor reception condition of the television-broadcast receiver 70, the display of the television broadcast becomes intermittent. In this case, according to the third embodiment, the images output from the television-broadcast receiver 70 can be recorded on the storage device 600. Thereafter, a switch SW1 is changed to connect contact F with contact D, and the recorded images are played back. Then, when the W-CDMA transceiver 91 or the wireless LAN module 161 becomes ready for displaying the images according to the television broadcast signal, the switch SW1 is changed to connect contact F with contact E. With this configuration, the images can be displayed without being considerably interrupted while the reception mode is being switched between the direct television-broadcast receiving means and the indirect television-broadcast receiving means.

Instead of using the storage device 600, the storage device 85 of the first or second embodiment may be used for storing the images. Additionally, the switch SW1 may preferably be controlled by a control signal from the signal processor 84.

In FIG. 7B, a signal before being decoded in the MPEG decoder 76 is stored in the storage device 85 of the PC function unit 83. In this case, a signal subjected to baseband processing in the baseband processor 74 is stored in the storage device 85 via the signal processor 84. When playing back the television broadcast signal stored in the storage device 85, the television broadcast signal is input into the MPEG decoder 76 and is MPEG-decoded into a video signal. Then, the changeover switch 82 is changed to connect contact C with contact A. Accordingly, the video signal is displayed on the display device 86 via the signal processor 84.

As discussed above, since signals are stored before being MPEG-decoded, the amount of data stored in the storage device 85 can be decreased.

MPEG decoding may be performed in the signal processor 84 by using software, in which case, the MPEG decoder 76 is not required.

Figure 8:
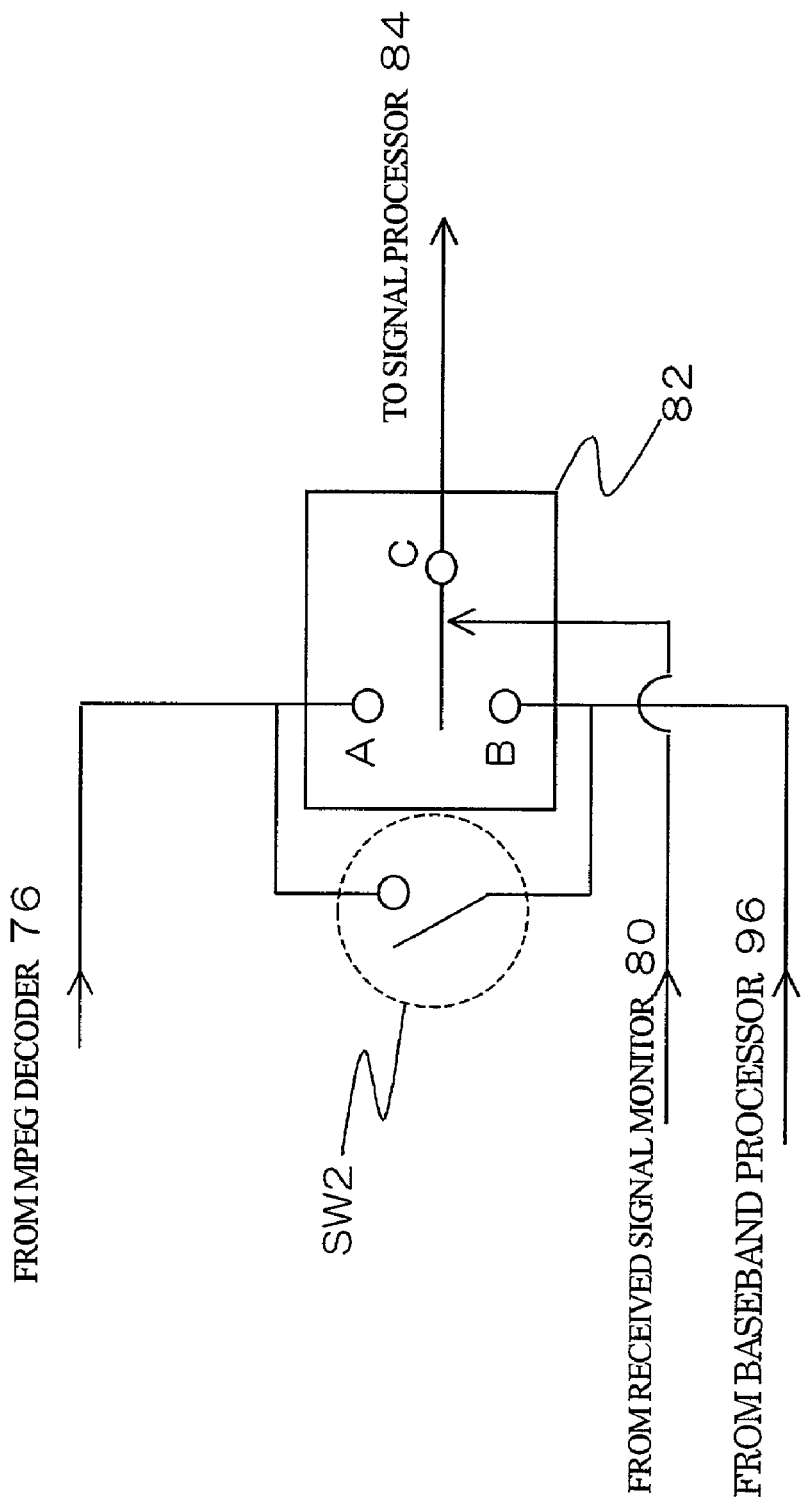
FIG. 8 is a circuit diagram illustrating a portion of a fourth embodiment of the present invention.

A fourth embodiment is discussed below with reference to FIG. 8. Only the essential portion of the fourth embodiment is shown in FIG. 8. In the fourth embodiment, a television broadcast received by the television-broadcast receiver 70 is transferred to the access point via the W-CDMA transceiver 91 of the first embodiment or the wireless LAN module 161 of the second embodiment.

In FIG. 8, a switch SW2 is provided between contacts A and B, and by closing the switch SW2, a television-broadcast video signal from the MPEG decoder 76 of the television-broadcast receiver 70 is output to the W-CDMA transceiver 91 or the baseband processor 96 of the wireless LAN module 161.

With this configuration, a television broadcast can be transferred to another apparatus. For example, a television broadcast program which is broadcast in a local broadcast station can be transferred to a remote place, or a television broadcast program can be recorded by using another apparatus.

Figure 9:
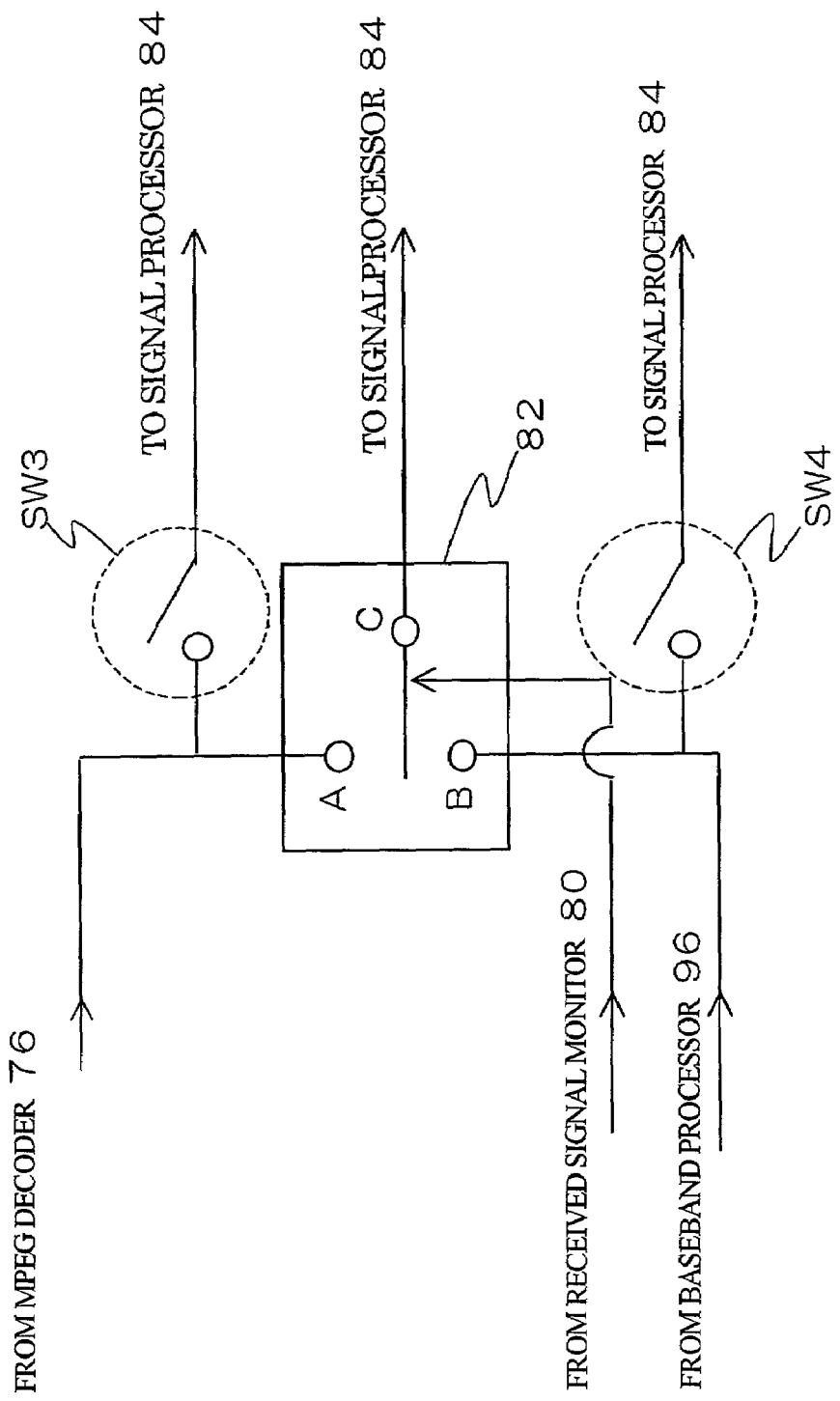
FIG. 9 is a circuit diagram illustrating a portion of a fifth embodiment of the present invention.

A fifth embodiment is described below with reference to FIG. 9. In the fifth embodiment, a television broadcast received by the television-broadcast receiver 70 and a television broadcast received by the W-CDMA transceiver 91 of the first embodiment or the wireless LAN module 161 of the second embodiment are input into the signal processor 84 via switches SW3 and SW4, and then, both the broadcast programs can be displayed. Accordingly, in the fifth embodiment, different television broadcasts from the television-broadcast receiver 70 and from the W-CDMA transceiver 91 or the wireless LAN module 161 can be received and displayed.

While various embodiments of the present invention have been shown and described, it should be understood that other modifications, substitutions and alternatives may be apparent to one of ordinary skill in the art. Such modifications, substitutions and alternatives can be made without departing form the spirit and scope of the invention, which should be determined from the appended claims.

Various features of the invention are set forth in the appended claims.

What is claimed is:

1. An information processing system, comprising:
    a remote terminal device transmitting a television broadcast via a communication network; and
    an information processing apparatus, comprising:
        a communication device receiving the television broadcast from said remote terminal device and transmitting a signal, wherein said communication device is able to perform transmission and reception via the communication network, and said communication device receives the television broadcast from a transmitting side to which said communication device has sent transmission request information including identification information,
        a television-broadcast receiver receiving television broadcast waves, and
        a reception monitor generating a selection signal determining whether the television broadcast is to be received by said television-broadcast receiver or by said communication device based on a reception condition of the television broadcast received by said television-broadcast receiver.

2. An information processing system according to claim 1, wherein said reception monitor generates the selection signal based on a signal indicating the reception condition of the television broadcast received by said television-broadcast receiver and a reception condition of the television broadcast received by said communication device.

3. An information processing system according to claim 1, wherein the communication network includes at least one of a public line and a private line.

4. An information processing system according to claim 1, wherein said reception monitor generates the selection signal by comparing a signal level indicating the reception condition of the signal received by said television-broadcast receiver with a predetermined corresponding signal level.

5. An information processing system according to claim 4, wherein the signal level indicating the reception condition and the predetermined corresponding signal level respectively indicate a signal-to-noise ratio of the received signal and a predetermined signal-to-noise ratio, a reception strength of the received signal and a predetermined reception strength, or a bit error rate of the received signal and a predetermined bit error rate.

6. An information processing system according to claim 1, further comprising a power control device for controlling power supply to said television-broadcast receiver or to said communication device based on the selection signal.

7. An information processing system according to claim 1, further comprising a storage device used for recording the television broadcast and for playing back the recorded television broadcast after the lapse of a delay time.

8. An information processing system according to claim 1, wherein the television broadcast received by said television-broadcast receiver is transmitted from said communication device via the communication network.

9. An information processing system according to claim 1, wherein both the television broadcast received by said television-broadcast receiver and the television broadcast received by said communication device are displayable.

10. An information processing apparatus, comprising:
    a television-broadcast receiver;
    a communication device receiving a television broadcast via a communication network and transmitting a signal, wherein said communication device is able to perform transmission and reception via the communication network, and said communication device receives the television broadcast from a transmitting side to which said communication device has sent transmission request information including identification information; and
    a reception monitor generating a selection signal determining whether the television broadcast is to be received by said television-broadcast receiver or by said communication device based on a reception condition of the television broadcast received by said television-broadcast receiver.

11. An information processing apparatus according to claim 10, further comprising a storage device, wherein a signal of the received television broadcast is recorded in said storage device.

12. An information processing apparatus according to claim 10, further comprising a storage device, wherein a signal of the received television broadcast is recorded in said storage device, and is also recorded in another storage device via said communication device.

13. An information processing apparatus according to claim 10, wherein said reception monitor generates the selection signal by comparing a signal level indicating the reception condition of the signal received by said television-broadcast receiver with a predetermined corresponding signal level.

14. An information processing apparatus according to claim 13, wherein the signal level indicating the reception condition and the predetermined corresponding signal level respectively indicate a signal-to-noise ratio of the received signal and a predetermined signal-to-noise ratio, a reception strength of the received signal and a predetermined reception strength, or a bit error rate of the received signal and a predetermined bit error rate.

15. An information processing system according to claim 10, further comprising a power control device for controlling power supply to said television-broadcast receiver or to said communication device based on the selection signal.

16. An information processing system according to claim 10, wherein the television broadcast received by said television-broadcast receiver is transmitted from said communication device via the communication network.

17. An information processing apparatus comprising:
    a television-broadcast receiver;
    a communication device receiving a television broadcast via a communication network and transmitting a signal, wherein said communication device is able to perform transmission and reception via the communication network, and said communication device receives the television broadcast from a transmitting side to which said communication device has sent transmission request information including identification information;
    a reception monitor generating a selection signal determining whether the television broadcast is to be received by said television-broadcast receiver or by said communication device based on a reception condition of the television broadcast received by said television-broadcast receiver; and
    a display device displaying the selected television broadcast.

18. A mobile computer, comprising:
    a television-broadcast receiver;
    a communication device receiving a television broadcast via a communication network and transmitting a signal, wherein said communication device is able to perform transmission and reception via the communication network, and said communication device receives the television broadcast from a transmitting side to which said communication device has sent transmission request information including identification information; and a reception monitor generating a selection signal determining whether the television broadcast is to be received by said television-broadcast receiver or by said communication device based on a reception condition of the television broadcast received by said television-broadcast receiver.

19. A method of processing information, comprising:

transmitting a television broadcast via a communication network;

receiving the television broadcast from a remote terminal device and transmitting a signal, wherein said receiving and transmitting is performed via the communication network, and said television broadcast is received from a transmitting side to which transmission request information including identification information is sent;

receiving television broadcast waves; and generating a selection signal determining whether the television broadcast is to be received by a television-broadcast receiver or by a communication device based on a reception condition of the television broadcast received by a television-broadcast receiver.

* * * * *